(12) United States Patent
Battersby et al.

(10) Patent No.: US 9,102,125 B2
(45) Date of Patent: Aug. 11, 2015

(54) PRINTED FLEXIBLE FILM FOR FOOD PACKAGING

(75) Inventors: Graham C. Battersby, Ann Arbor, MI (US); Stephen A. Santos, Cumberland, RI (US); Bin Zhong, North Attleboro, MA (US); Xiangdong Gan, Franklin, MA (US)

(73) Assignee: Mantrose-Haeuser Co., Inc., Lincoln, RI (US)

( * ) Notice: Subject to any disclaimer, the term of this patent is extended or adjusted under 35 U.S.C. 154(b) by 143 days.

(21) Appl. No.: 13/390,956

(22) PCT Filed: Aug. 26, 2010

(86) PCT No.: PCT/US2010/046754
§ 371 (c)(1),
(2), (4) Date: May 3, 2012

(87) PCT Pub. No.: WO2011/025858
PCT Pub. Date: Mar. 3, 2011

(65) Prior Publication Data
US 2012/0207887 A1    Aug. 16, 2012

Related U.S. Application Data

(60) Provisional application No. 61/236,907, filed on Aug. 26, 2009.

(51) Int. Cl.
| | |
|---|---|
| *B29D 22/00* | (2006.01) |
| *B32B 27/08* | (2006.01) |
| *B65D 65/40* | (2006.01) |
| *B41M 7/02* | (2006.01) |
| *B32B 27/36* | (2006.01) |
| *B41M 7/00* | (2006.01) |
| *B32B 27/32* | (2006.01) |
| *C09D 193/02* | (2006.01) |

(52) U.S. Cl.
CPC .............. *B32B 27/08* (2013.01); *B65D 65/40* (2013.01); *B32B 27/32* (2013.01); *B32B 27/36* (2013.01); *B41M 7/0045* (2013.01); *B41M 7/02* (2013.01); *C09D 193/02* (2013.01)
USPC ........................ 428/35.2; 426/127; 428/36.6

(58) Field of Classification Search
CPC ........ B32B 27/08; B32B 27/32; B32B 27/36; B41M 7/02; B41M 7/0045; C09D 193/02; C08L 71/02; C08L 89/00; C08L 1/28; B65D 65/40; Y10T 428/1334; Y10T 428/1379

USPC ................................ 428/35.2, 36.6; 426/127
See application file for complete search history.

(56) References Cited

U.S. PATENT DOCUMENTS

| | | | |
|---|---|---|---|
| 4,874,618 | A | 10/1989 | Seaborne et al. |
| 6,348,217 | B1 | 2/2002 | Santos et al. |
| 6,677,014 | B1 | 1/2004 | Edlein et al. |
| 7,063,882 | B2 | 6/2006 | Mossbrook et al. |
| 7,083,673 | B2 | 8/2006 | Bowden |
| 2003/0031851 | A1 | 2/2003 | Bourdelais et al. |
| 2003/0191210 | A1 | 10/2003 | Autran |
| 2003/0204027 | A1 | 10/2003 | Autran |
| 2003/0204028 | A1 | 10/2003 | Autran |
| 2003/0236358 | A1 | 12/2003 | Autran et al. |
| 2004/0016208 | A1 | 1/2004 | Mumpower et al. |
| 2004/0059047 | A1 | 3/2004 | Autran et al. |
| 2004/0217087 | A1 | 11/2004 | Celii et al. |
| 2005/0019533 | A1 | 1/2005 | Mossbrook et al. |
| 2005/0039689 | A1 | 2/2005 | Mossmer |
| 2005/0192377 | A1 | 9/2005 | Scheer et al. |
| 2006/0172042 | A1 | 8/2006 | Clemons |
| 2007/0116910 | A1 | 5/2007 | Polykarpov et al. |
| 2007/0129467 | A1 | 6/2007 | Scheer |
| 2007/0148384 | A1 | 6/2007 | Bowden et al. |
| 2007/0203283 | A1 | 8/2007 | Scheer |
| 2007/0259139 | A1 | 11/2007 | Furneaux |
| 2007/0292567 | A1 | 12/2007 | Kaas et al. |
| 2007/0292643 | A1 | 12/2007 | Renn |
| 2008/0113887 | A1 | 5/2008 | Scheer et al. |
| 2008/0153940 | A1 | 6/2008 | Scheer et al. |

FOREIGN PATENT DOCUMENTS

| | | |
|---|---|---|
| JP | 2003165570 A | 6/2003 |
| JP | 2006096981 A | 4/2006 |
| WO | 01/02368 A1 | 4/2001 |

OTHER PUBLICATIONS

International Search Report and Written Opinion from International Application No. PCT/US/46754 mailed Oct. 21, 2010.
Patent Examination Report from Australian Patent Application No. 2010286690, dated Feb. 18, 2013.
First Office Action from Chinese Patent Application No. 201088043388.3, dated Dec. 26, 2013.
Search Report from European Patent Application No. 10812606.1 dated Jun. 5, 2014; 10 pages.
Office Action from Mexican Patent Application No. MX/a/2012/00228 dated Jul. 22, 2014, received Sep. 9, 2014.
English Translation of Office Action from Israeli Patent Application No. 218275 dated Feb. 5, 2015.

*Primary Examiner* — Walter B Aughenbaugh
(74) *Attorney, Agent, or Firm* — Calfee, Halter & Griswold LLP

(57) ABSTRACT

The printed image on a major face of a flexible food packaging film is covered by a shellac barrier coating.

27 Claims, No Drawings

PRINTED FLEXIBLE FILM FOR FOOD PACKAGING

CROSS-REFERENCE TO RELATED APPLICATION

Priority is claimed to U.S. provisional application Ser. No. 61/236,907, filed Aug. 29, 2009, the disclosure of which is incorporated herein by reference.

BACKGROUND

This invention relates to food packaging materials in the form of flexible films bearing printed images.

In order to provide food packaging films with improved barrier properties, multi-layer films of two or more synthetic resins are normally used. Examples include coextruded polyethylene/polypropylene ("coex") laminated to polyethylene terephalate (PET), PET laminated to LDPE (low density polyethylene), and metalized PET laminated to coex. Other such multi-layer food packaging films can be formed from nylon, metal foil, and ethylene vinyl acetate polymers and copolymers.

Where it is desired to provide such laminated packaging films with printed images, the image is normally printed on the outside of the film, i.e., on the major face of the film not facing the food in the package. When transparent or translucent packaging films are used, the image can be printed on the inside of the film instead.

To protect these printed images from damage due to rubbing, flexing, abrasion and heat sealing, these printed images are often covered with a suitable barrier coating or "trap-print film." See, U.S. Pat. No. 7,063,882 to Mossbrook et al., the entire disclosure of which is incorporated herein by reference. If so, these trap-print films are normally made from materials suitable for direct food contact ("food compatible material"), even if the image is printed on the outside face of the packaging film. Because most packaging films are supplied in the form of large rolls, trap-print films on the outside face of a film contact the film's inside face when the film is wound up upon itself in forming the roll. Therefore, even if the packaging film is printed on its outside face, the trap-print film will normally be made from a food compatible material to prevent contamination of the inside, food contacting face of the same film.

Trap-print films can be applied to printed packaging films by any conventional technique. For example, trap-print films can be applied by extrusion coating, if desired. However, because of the time needed to set up the extruder and the considerable waste generated when the extruder is started and stopped, extrusion coating usually requires long production runs to be economically viable.

Trap-print films can also be applied by laminating with adhesive bonding. However, this approach limits the inks that can be used for printing to those which retain very low levels of solvent so as not to adversely affect the bond strength of the subsequently applied adhesive. These adhesives exhibit generally low bond strengths before cure, which may result in undesirable bubble formation and/or "tunneling." In addition, full cure of these adhesives can be slow, which often requires these films to be stored before processing is complete, which in turn increases capital costs. In those situations where two component adhesives are used, these adhesives must be discarded if not applied quickly enough, which also increases costs.

In order to avoid these problems, it has also been proposed to form such trap-print films from electron beam activated coatings. However, election beam curing equipment is not widely available in the food packaging industry. Moreover, this equipment, as well as the materials used in electron beam coating in general, are expensive.

SUMMARY

In accordance with this invention, these problems are avoided by forming such trap-print films from shellac or analogue.

Thus, this invention provides a food packaging film comprising a flexible film substrate made from a material exhibiting a better resistance to penetration by oxygen and water vapor than paper, the flexible film substrate having a pair of opposed major faces, a printed image on at least one major face, and a barrier coating covering the printed image, the barrier coating comprising a water vapor-impermeable, organic-origin, food compatible film forming material.

A packaged food product comprising a food item wrapped by such a food packaging film is also provided.

DETAILED DESCRIPTION

Flexible Film Substrate

Essentially any material which has previously been used, or which is used in the future, for forming a flexible packaging film for foods with improved barrier properties can be used as the flexible film substrate of this invention. In this context, "food" will be understood to include liquids and semi-solids such as pudding and gelatin as well as traditional solid foods. In addition, "improved barrier properties" will be understood to mean that the material used for forming the substrate exhibits better resistance to penetration by oxygen and water vapor than paper. Thus, the substrate of the inventive food packaging film can be made from a wide variety of different synthetic resins such as polyethylene (LDPE, LLPE, VLDPE, HDPE, MDPE), polypropylene, polyethylene terephalate, nylon, other vinyl polymers and copolymers such as those made from vinyl acetate, vinyl alcohol, vinyl chloride, etc., and so forth. In addition, the substrate of the inventive food packaging film can also be made from metal foils such as aluminum foil and the like. In addition, the substrate of the inventive food packaging film can also be made from a wide variety of different naturally occurring film forming resins, especially those which are degradable, biodegradable or compostable.

A degradable resin is a resin which undergoes significant change in its chemical structure under specific environmental conditions, resulting in a loss of some properties. A biodegradable resin is a degradable resin which degrades from naturally occurring microorganisms, such as bacterial, fungi, etc. A compostable resin is a biodegradable resin which biodegrades in a similar time frame as cellulose into a decomposition product which is both non-toxic and disintegrated.

Biodegradable resins are typically derived from renewable raw materials such as starch (e.g., corn, potato, tapioca, etc.), cellulose, soy protein, lactic acid, etc. They are not hazardous in production and normally decompose back into carbon dioxide, water, biomass, etc. when discarded. Corn starch is currently the main raw material being used in the manufacture of bioplastic resins. Mater-Bi (main component corn-starch), and Polylactides (PLA) (made from corn-starch as well) are currently the two main resins (raw materials), being used today in the production of compostable and biodegradable resins and are certified for compostability under standards set by international organizations. However, other bioplastics coming into the market are made from potato starch, soybean protein, cellulose, etc. Currently, most of these bioplastics are not certified for compostability, although some are for biodegradability. The field of bioplastics is constantly evolving with new materials and technologies being worked on and being brought to market.

Preferred biodegradable resins ("bioplastics") are those which are not only biodegradable but also compostable. Especially preferred bioplastics conform with ASTM-6400 relating to Compostable Plastics. As described there, a Compostable Plastic conforming to this standard is one which is "capable of undergoing biological decomposition in a compost site as part of an available program, such that the resin is not visually distinguishable and breaks down to carbon dioxide, water, inorganic compounds, and biomass, at a rate consistent with known compostable materials (e.g., cellulose) and leaves no toxic residue."

Under ASTM-6400, a resin is compostable if it exhibits certain minimum levels of biodegradability, ability to disintegrate and non-toxicity. A resin is biodegradable under this standard if at least 60% of the resin biodegrades in 180 days, as measured by the amount of $CO_2$ produced by this decomposition. A resin is disintegratable under this standard if less than 10% of its decomposition product, when sieved, remains on a 2 mm screen. A resin is non-toxic under this standard if the heavy metal content of its decomposition product remains below certain prescribed limits and, in addition, if when combined with soil in different concentrations it is capable of supporting a certain level of plant growth relative to a control compost.

Compostable resins, as well as packaging and other products made therefrom, are described in a number of recently published and/or issued patent documents, examples of which include: U.S. Pat. No. 7,083,673, US 2008/0153940, US 2008/0113887, US 2007/0259139, US 2007/0203283, US 2007/0148384, US 2007/0129467, US 2004/0217087, US2005/0192377, US 2005/0039689, US 2004/0059047, US 2003/0236358, US 2003/0204028, US 2003/0204027 and US 2003/0191210. The disclosures of these documents are incorporated herein by reference.

As indicated above, many biodegradable and/or compostable resins and products are already known and commercially available. Examples include products made from 100% sugar cane fiber (bagasse), products made from corn plastics (which are polylactides or "PLA"), and products made from potato starch and/or corn starch. Specific commercially available products include the EarthShell® line of disposable products available from EarthShell Corporation of Lutherville, Md., the line of compostable food and beverage containers being currently introduced by New Ice, Inc. of Durango, Colo., and the NatureFlex™ line of packaging films available from Innovia Films of Merelbeke, Belgium.

As indicated above, any of these materials can be used for forming the substrate of the inventive food packaging film. In some embodiments of this invention, combinations of two or more of these materials can also be used for this purpose. For example, blends of two or more of these materials can be used for forming a single layer film, or even a multiple layer film. More commonly, however, the substrate of the inventive food packaging film will be formed from a multi-layer film composed of two or more layers of the above materials bonded together by any known technique such as co-extrusion, laminating with or without an adhesive, coating, etc. For example, any of the multi-layer products described in the background section of this disclosure can be used for this purpose, in particular coextruded polyethylene/polypropylene ("coex") laminated to polyethylene terephalate (PET), PET laminated to LDPE (low density polyethylene), and metalized PET laminated to coex.

In those embodiments of this invention in which the printed image is located on the inside major face of the substrate, this substrate will normally be formed from an image-transparent film. In this context, "image-transparent" refers to a film which is sufficiently translucent so that an image printed on the inside major face of the film can be discerned when viewed through the outside (or other) major face of the film. In other words, the image can be viewed through the film. Thus, it will be understood that image-transparent flexible film substrate can be made not only from transparent materials but also from materials which are translucent, provided that the film substrate is thin enough so that the image printed on its inside major face can be discerned when viewed through its outside major face.

The thickness of the flexible film substrate of the inventive food packaging film is not critical and essentially any thickness can be used. However, the film substrate should be thin enough so that the inventive food packaging film made therefrom remains flexible enough to serve as a food packaging wrap yet thick enough to provide the necessary structural integrity and barrier properties for the application intended. In this context, "packaging wrap" will be understood as referring to a film of material which resembles conventional aluminum foil and/or plastic wrap in terms of its flexibility in the sense that it can be supplied in the form of a long continuous sheet rolled up upon itself, and then unwound from the roll and then easily used to wrap different food items by hand. Thus, a "packaging wrap" will be understood to include, for example, plastic bags and other relatively pliable plastic packaging materials but to exclude more rigid materials. For example, although the wall of a Styrofoam cup can be regarded as "flexible," it is not considered to be a "packaging wrap" in the context of this disclosure, because it is not flexible enough to be wound up upon itself or to easily fold over on itself during wrapping of different food items by hand.

Normally, this means that the flexible film substrate will be at least about 1 micron thick. Minimum thicknesses of at least about 10 microns, at least about 50 microns, or even at least about 100 microns or even at least about 150 microns are more interesting. In terms of maximum thickness, this normally means that the flexible film substrate will be no greater than about 5,000 microns thick. Maximum thicknesses of no greater than about 1,000 microns, no greater than about 500 microns, or even no greater than about 250 microns are more interesting.

As appreciated by those skilled in the art, minimum, maximum, and desired thicknesses depend at least in part on the particular material the flexible film substrate is made from, as well as its intended utility, and can easily be determined by routine experimentation.

Printed Image

As indicated above, the printed image of the inventive food packaging film can be applied to either major face of the film's substrate, i.e., its inside major or its outside major face. In addition, the same or different printed images can be applied to both major faces of the substrate, if desired. For this purpose, any known printing technique can be used including gravure printing, ink jet printing, silk screen printing, flexographic printing, lithographic printing, electrophotographic printing, intaglio printing, tampo printing, pad printing, letter press printing, etc.

Any printing ink that that has previously been used, or which may be used in the future, for printing images on flexible food packaging films can also be used for forming the printed images of the inventive food packaging film. A particular advantage of this invention is that the shellac and analogue barrier coatings provided by this invention effectively prevent contact between this ink and the food product being packaged. As a result, printing inks which are not suitable for food contact can be used in this invention, as well as those which are suitable for food grade contact, because these barrier coatings effectively isolate the ink used from the food being wrapped.

Examples of suitable printing inks for use in this invention include solvent based inks such as nitrocellulose modified inks, polyurethane inks, polyvinylchloride based inks, polyamide based inks and polyvinyl butyral based inks; water based inks such as acrylic polymer based inks, rosin maleic polymer based inks, protein based inks and acrylic modified inks; and 100% solids inks such as ultraviolet (UV) cured acrylate inks, UV cured cationic inks, electron beam (EB) cured inks, and non-acrylate UV cured inks.

These printing inks can be used to form any type of printed image on one or both major faces of the flexible substrate film of the inventive flexible food packaging film. For example, purely fanciful designs and artwork can be printed, as can images and/or indicia providing useful information such as, for example, pictures of the food items being packaged, the size, volume, quality and/or brand of the food products being packaged, and the like. Printed images intended printed on the inside major face of the substrate will, of course, need to be the reverse of the image to be viewed by the reader, since it will viewed through the substrate from its outside face.

Barrier Coating

In accordance with this invention, the printed image appearing on a major face of the film substrate of the inventive flexible food packaging film is overcoated with a barrier coating made from shellac or other analogous material. Because such films can be easily applied by simple coating techniques, the trouble and expense associated with extrusion coating and electron beam coating techniques are totally avoided. In addition, because shellac and its analogues are essentially unreactive with the printing inks (and solvents) normally used for printing flexible food packaging films, the trouble and expense associated with adhesive laminating techniques are also avoided. At the same time, shellac and its analogues exhibit excellent barrier properties which can be used to complement the barrier properties of the flexible film substrates on which they are applied. The overall result is that flexible food packaging films exhibiting excellent barrier properties can be produced very simply and inexpensively.

Shellac coatings have been used for many years as food preservatives. For example, apples and other fruits, both whole and in sections, are commonly coated with shellac to prevent degradation from moisture and atmospheric oxygen. In accordance with this invention, shellac or analogue is used as a barrier coating on the printed image formed on a major face of the substrate of the inventive flexible food packaging film, not only to protect the food item being packaged from contact with the printing ink from which the image is made but also to improve the barrier properties of the inventive food packaging film as a whole.

Shellac is a naturally occurring thermoplastic obtained from secretions of the female lac bug. It exhibits a remarkable combination of properties making it an ideal food packaging material, these properties including low permeabilities to oxygen, water vapor, $CO_2$, ethylene and various odors, low lipid solubility, excellent color and excellent clarity. It also is food compatible, has very low odor, and imparts no flavors, smell or taste to the packaged foods.

Shellac is available commercially in four different grades, orange shellac, dewaxed orange shellac, regular bleached shellac ("waxy white shellac" in Europe) and refined bleached shellac. Any grade of shellac is useful for carrying out this invention. Dewaxed orange shellac is preferred, while refined bleached shellac is even more preferred.

In lieu of and/or in addition to shellac, any other organic-origin, water vapor-impermeable, food compatible, film forming material can also be used. In this context, "organic-origin" means a material of animal or plant origin as opposed to a material derived from coal, petroleum, natural gas, tar sands or similar hydrocarbonaceous material. In addition, "food compatible" means that the material is suitable for contact with food and/or beverages as determined by U.S. Code of Federal Regulations. In addition, "water vapor-impermeable" means that the resistance of the material to permeation by water vapor at room temperature is at least 50% of that of refined bleached shellac. In some embodiments of this invention, the shellac analogue will have a resistance to permeation by water vapor at room temperature of at least 75%, 85% or even 95% of that of refined bleach shellac, while in other embodiments the shellac analogue will have a resistance to permeation by water vapor at room temperature at least as good as that of refined bleached shellac.

Preferably, these film forming shellac analogues also have low oxygen permeability. By "low oxygen permeability" is meant that the oxygen impermeability of material is at least 50% of that of refined bleached shellac, as determined by the time it takes the open flesh of a cut apple section coated with the material to develop a noticeable brown color through oxidation. Preferred shellac analogues have oxygen impermeabilities of at least 75%, or even, 85%, 95% or 100%, of refined bleached shellac.

It is also desirable for these shellac analogues to be lipid insoluble, as this may prevent the inventive packaging film from losing its transparency when coming into contact with lipids or other organic liquids. By "lipid insoluble" is meant that the amount of a 1 gram sample of the material which dissolves in canola oil at room temperature after 24 hours is less than twice that of refined bleached shellac. Shellac analogues with solubilities in canola oil less than 1.5 times that of refined bleached shellac are more interesting, while those having solubilities in canola oil less than that of refined bleached shellac are even more interesting.

Any organic-origin, food compatible, water vapor-impermeable film forming material exhibiting the above properties can be used as the shellac analogue in this invention. Thus, appropriate shellac analogues may be selected from certain polysaccharides including cellulose and its derivatives such as hydroxyethyl cellulose (HEC), ethyl cellulose and microcrystalline cellulose. Appropriate shellac analogues may also be selected from lipids and resins including waxes and oils such as paraffin wax, carnauba wax, beeswax, candelila wax and polyethylene wax; fatty acids and monoglycerides such as stearyl alcohol, stearic acid, palmitic acid, mono- and di-glycerides; naturally-occurring resins such as wood resin; and coumarone-indene. Appropriate shellac analogues may also be selected from proteins including corn zein (a-zein, b-zein and/or v-zein), wheat gluten, soy protein, peanut protein, keratin, collagen, gelatin, milk protein (casein) and whey protein. In addition, the protective coatings described in U.S. Publish patent application US 2007/02922643, the entire disclosure of which is incorporated herein by reference, can also be used. Examples include Chitosan-NaOH, ethyl cellulose, Curdlan, Deacetylated Konjac, Michelman Vapor Coat® 2200R, NuCoat® 6661B, etc. Mixtures of these materials can also be used.

The properties exhibited by films made from shellac analogues depend not only on the material itself including such features as molecular weight and purity but also on other parameters such as any other material that may also be present, coating thickness, and the manner in which the film is applied. Accordingly, care should be taken in selecting particular materials for use as shellac analogues to select those materials and/or combinations of materials which will achieve the level of water vapor-impermeability and other properties desired taking into account these variables. Based on these considerations, persons of ordinary skill in the art should have no difficulty choosing particular film forming materials for particular applications.

In addition to these naturally occurring film formers, the barrier coatings of this invention can also be formulated with other additional ingredients. For example, these barrier coatings can include organic-origin film forming materials not exhibiting the above water vapor resistance properties. Examples include certain types of polysaccharides such as carboxymethyl cellulose (CMC), methyl cellulose (MC), hydroxypropyl cellulose (HPC) and hydroxypropyl methylcellulose (HPMC); starches and derivatives such as raw starch, modified starch, pregelatinized starch, dextrin, maltodextrin corn syrup sucrose, dextrose/fructose and sugar polyols; extrudate gums such as gum arabic, gum ghatti, gum karaya and gum tragacanth; seed gums such as guar gum and locust bean gum; microbial fermentation gums such as xanthan, gallan gum and chilosan; seaweed extracts such as agar, alginates, carageenans and furcellaran; and pectins.

Still additional ingredients that can be included in the barrier coatings of this invention include plasticizers, detackifiers and coloring agents. Examples of suitable plasticizers include glycols such as polyethylene glycol (PEG), polypropylene glycol (PPG), etc., lipids such as vegetable oils, mineral oils, medium chain triglycerides, fats, fatty acids, waxes, etc. Examples of suitable detackifiers include proteins such as zein, etc. and lipids such as acetylated monoglycerides, medium chain triglycerides, oils, waxes, fatty acids such as stearic acid and oleic acid, etc. Examples of suitable coloring agents include pigments such as organic pigments and inorganic pigments, dyes and other naturally occurring colorants.

The barrier coatings of this invention can be applied to the flexible substrate film by any conventional technique. Usually, the ingredients forming the inventive protective coating will be combined with a suitable liquid carrier to form a liquid coating composition and the composition so formed then applied to the flexible film substrate by any suitable means such as brushing, spraying, dipping or the like. Examples of suitable carrier liquids include water, various alcohols such as methanol, ethanol, isopropanol, etc. various ketones such as acetone, methyl ethyl ketone, etc., various glycols such as propylene glycol, etc., various glycol ethers, various esters such as ethyl acetate, and so forth. A particular advantage of using organic solvent based carrier liquids is that application speeds are generally high since organic solvents tend to evaporate faster than water. On the other hand, a particular advantage of using aqueous based carrier liquids is that discharge of organic based solvents to the atmosphere is largely eliminated.

The thickness of the barrier coatings of this invention can vary widely and essentially any thickness that will provide the desired degree of protection can be used. Generally speaking, minimum thicknesses on the order of at least about 0.1 microns, more typically at least about 1 micron, or even at least about 5 microns are contemplated, as are maximum thickness of no greater than about 100 microns, more typically no greater than about 50 microns, or even no greater than about 10 microns. Normally, the coating compositions used to form the barrier coatings of this invention will be formulated so that they can be applied in a single application, although multiple applications can be used, if desired. In this connection, a particular advantage of using multiple applications is that it eliminates, or at least substantially reduces, the adverse effects of defects and/or pin holes that may form in the barrier coating if only one application is used.

The proportions of ingredients in the barrier coatings of this invention can also vary widely and essentially any amounts can be used. Normally, these coatings will contain at least about 50 wt. % shellac or analogue based on the combined weight of the protective coating, i.e., excluding any liquid carrier used to apply the coating. More commonly, these protective coatings will contain about 65, 75, 85 or even 95 wt. % or more of shellac or analogue.

Similarly, the barrier coatings of this invention may also contain up to about 40 wt. % co-film former on the same basis (i.e., excluding any liquid carrier), although co-film former amounts on the order of up to about 30 wt. %, 20 wt. % or even 10 wt. % are more common. If used, the co-film former will normally be present in an amount sufficient to achieve a noticeable change in the properties of the barrier coating usually at least about 0.5 wt. %, 1 wt. %, 2 wt. % or even 5 wt. % on the same basis.

The barrier coatings of this invention may also contain about 0-50 wt. % detackifier on the same basis, although detackifier concentrations on the order of >0 to 40 wt. %, about 3 to 35 wt. % or even about 5-35 wt. % are more common, at least when shellac is selected as the primary film forming resin. Similarly, the barrier coatings of this invention may also contain about 0-50 wt. % plasticizer on the same basis, although plasticizer concentrations on the order of >0 to 40 wt. %, about 3 to 35 wt. % or even about 5-35 wt. % are more common.

The barrier coatings of this invention can be clear or colored. If colored, the amount of coloring agent used should be enough to develop the desired color. In this regard, a particularly interesting feature of this invention is that at the barrier coatings of this invention can be provided with a contrasting color from that forming the printed image on the substrate coating. In this context, "contrasting color" means a color which causes the image printed on the flexible substrate film to be more easily visible as compared with an otherwise identical barrier film in which no colorant is used. Thus, colorant concentrations on the order of about 0.1 to 3 wt. %, more commonly about 0.3 to 2 wt. % or even 0.4 to 1 wt. % for very light colors or tints are contemplated, while colorant concentrations on the order of 10-30 wt. % for organic pigments and 40-60 wt. % for inorganic pigments such as titanium dioxide are contemplated.

In addition to the above ingredients, the barrier coatings of this invention can also be provided with still other materials for providing desired functional characteristics. For example, the barrier coatings can be compound with materials that provide the coatings with heat resistance, a desired coefficient of friction, blocking resistance, crinkle resistance, gloss or matte appearance, antibacterial or antifungal properties, brand protection materials, interesting optical effects such as those obtained from pearlescent pigments or light interference pigments, metallic pigments, fragrances including those fragrances incorporated in encapsulated materials that can be released over time or when the capsule is fractured, and the like.

The concentration of the liquid carrier used to form the coating compositions used to form the barrier coatings of this invention can also vary widely, and essentially any amount can be used. Concentrations of liquid carrier on the order of about 20 to 90 wt. % or more are possible, based on the total weight of the coating composition as a whole, although concentrations on the order of 40 to 85 wt. %, 55 to 75 wt. % are more common.

In accordance with another embodiment of this invention, the barrier coatings of this invention are pattern applied, i.e., they are applied in a predetermined pattern covering less than then entire surface area of the inside major face of the flexible film substrate. With this approach, a suitable barrier can be provided in selected areas of the inventive food packaging film, such as those areas where greater protection against contact between the printing ink and the food item being packaged is necessary. Additionally or alternately, the barrier coating can be made a different color from both the flexible film substrate and the image printed thereon, so that the barrier coating generates its own complementary graphic thereby creating a multiple image/graphic design with the printing ink.

A particular advantage of this invention, at least when shellac or other similar organic material is used to form the barrier coating, is that these materials are derived from renewable and sustainable resources. Moreover, if the flexible film substrate used to form the inventive packaging material is biodegradable, a further benefit of the invention is that this entire packaging film is biodegradable, which is a significant advantage when the inventive packaging film is disposed of via a land fill.

Still another advantage of this invention is that the barrier coatings of this invention, at least when formed from shellac, can be readily removed by dissolution in alcohol or other similar solvent. This is particularly advantageous in those situations in which it is desired to recycle the inventive packaging material to reclaim and reuse the material from which its flexible film substrate is made.

In this regard, many laminates cannot be efficiently recycled or disposed of other than in landfills because they contain incompatible materials. For example, a laminate composed of paper and LDPE will not biodegrade and hence is not compostable. Nor can the LDPE or paper layers be recovered separately and recycled because they are an integral part of the laminate. Similarly, a PET/Al-foil/LDPE laminate cannot be recycled and can only be disposed of in a land fill, because all of its layers are not biodegradable and cannot be separated from one another.

This problem is avoided by the inventive packaging film, because its barrier coating can be readily removed by establish de-inking processes such as the aqueous washing or floatation deinking processes used for de-inking and recycling printed paper. In addition, because the barrier coating of the inventive packaging film is made from an organic-origin, food compatible film forming material, it can be directly used as is as a feed for polymer recycling processes which make thermo-formable polymer pellets from lower grade recycled polymers. Such low grade recycled polymers are used to make a wide variety of different products, e.g., garden furniture, by molding thermoplastic polymer pellets produced from these recycled polymers. Laminate structures formed from metal foils and/or thermoset plastics are not suitable for this purpose, because these materials cannot be recycled or thermoformed. This problem is avoided by the inventive packaging film, at least when its flexible film substrate is made from a thermoplastic material, because the amalgamated material produced by combining its substrate and coating together is still thermoformable.

EXAMPLES

The following tables illustrate hypothetical coating compositions that can be used to form barrier coatings according to this invention:

TABLE 1

Coating Composition for Providing Basic Water-Insoluble, Lipid-Insoluble, Oxygen Impermeable Barrier Coating

| Function | Ingredient | Weight Percent |
| --- | --- | --- |
| Carrier | Ethyl Alcohol & Water (81/19 ratio by wt) | 70 |
| Film Former | Refined Shellac | 28 |
| Detackifier | Corn Protein—Zein | 1 |
| Plasticizer | Polyethylene Glycol (PEG E400) | 1 |
| | TOTAL WT % | 100 |

TABLE 2

Coating Composition for Providing Plasticized and Detackified Water-Insoluble, Lipid-Insoluble, Oxygen Impermeable Barrier Coating

| Function | Ingredient | Weight Percent |
| --- | --- | --- |
| Carrier | Ethyl Alcohol | 19.3 |
| Carrier | Water | 13.4 |
| Carrier | Acetone | 19.3 |
| Carrier | Isopropyl Alcohol | 19.3 |
| Film Former | Refined Shellac | 20.4 |
| Detackifier | Corn Protein—Zein | 7.0 |
| Plasticizer | Polyethylene Glycol (PEG E400) | 1.0 |
| Co-Film Former | Hydroxypropyl-methyl Cellulose | 0.3 |
| | TOTAL WT % | 100 |

Although only a few embodiments of this invention have been described above, it will be appreciated that many modifications can be made without departing from the spirit and scope of the invention. All such modifications are intended to be included within the scope of the present invention, which is to be limited only by the following claims:

The invention claimed is:

1. A food packaging film having sufficient flexibility so that it can be supplied in the form of a long continuous sheet rolled up upon itself and then unwounded from the roll for wrapping different food items by hand, the food packaging film comprising
    a flexible film substrate made from a material exhibiting a better resistance to penetration by oxygen and water vapor than paper selected from the group consisting of synthetic resins, metal foils, and naturally occurring film forming resins which are at least one of degradable, biodegradable and compostable, the flexible film substrate having a pair of opposed major faces, and a printed image on at least one major face, and
    a barrier coating covering the printed image, the barrier coating comprising a water vapor-impermeable, organic-origin, food compatible film forming material having a resistance to permeation by water vapor at room temperature which is at least 50% of that of refined bleached shellac and an oxygen impermeability of at least 50% of that of refined bleached shellac as determined by the time it takes the open flesh of a cut apple section coated with the material to develop a noticeable brown color through oxidation.

2. The food packaging film of claim 1, wherein the substrate is formed from a synthetic resin, a naturally occurring resin, a metal, or a combination thereof.

3. The food packaging film of claim 2, wherein the barrier coating comprises shellac.

4. The food packaging film of claim 3, wherein the barrier coating comprises at least one of dewaxed orange shellac and refined bleached shellac.

5. The food packaging film of claim 3, wherein the barrier coating includes a co-film former.

6. The food packaging film of claim 3, wherein the substrate is a multilayer article, and further wherein at least two of the layers in this multilayer article are different from one another.

7. The food packaging film of claim 2, wherein substrate is formed from a synthetic resin, a naturally occurring resin, or a combination thereof.

8. The food packaging film of claim 7, wherein the barrier coating comprises shellac.

9. The food packaging film of claim 8, wherein the barrier coating comprises at least one of dewaxed orange shellac and refined bleached shellac.

10. The food packaging film of claim 8, wherein the barrier coating includes a co-film former.

11. The food packaging film of claim 8, wherein the substrate is a multilayer article, and further wherein at least two of the layers in this multilayer article are different from one another.

12. The food packaging film of claim 1, wherein the barrier coating has a resistance to permeation by water vapor at room temperature of at least 75% of that of refined bleached shellac and an oxygen impermeability of at least 75% of that of refined bleached shellac.

13. The food packaging film of claim 1, wherein the barrier coating is lipid insoluble.

14. The food packaging film of claim 13, wherein the barrier coating has a resistance to permeation by water vapor at room temperature of at least 75% of that of refined bleached shellac and an oxygen impermeability of at least 75% of that of refined bleached shellac.

15. The food packaging film of claim 1, wherein the flexible film substrate is biodegradable and further wherein the barrier coating comprises shellac.

16. The food packaging film of claim 15, wherein the flexible film substrate is compostable.

17. The food packaging film of claim 16, wherein the flexible film substrate is a multi-layer film composed of at least two layers of different materials.

18. The combination comprising a food or pharmaceutical item and a wrapper fully enclosing the food or pharmaceutical item, wherein the wrapper comprises the food packaging film of claim 1.

19. The combination of claim 18, wherein the barrier coating comprises shellac.

20. The combination of claim 19, wherein the barrier coating comprises at least one of dewaxed orange shellac and refined bleached shellac.

21. The combination of claim 19, wherein the flexible film substrate is biodegradable.

22. The combination of claim 19, wherein the flexible film substrate is compostable.

23. The food packaging film of claim 22, wherein the flexible film substrate is made from coextruded polyethylene/polypropylene laminated to polyethylene terephalate, polyethylene terephalate laminated to low density polyethylene or metalized polyethylene terephalate laminated to coextruded polyethylene/polypropylene.

24. The food packaging film of claim 22, wherein the flexible film substrate is made from a multi-layer film in which at least one of the layers is selected from the group consisting of nylon, metal foil, and ethylene vinyl acetate polymers and copolymers.

25. The food packaging film of claim 1, wherein the substrate is formed from a naturally occurring film forming resin which is at least one of degradable, biodegradable and compostable, and further wherein the barrier coating comprises shellac.

26. The food packaging film of claim 25, wherein the barrier coating comprises at least one of dewaxed orange shellac and refined bleached shellac.

27. The food packaging film of claim 1, wherein the flexible film substrate is made from a multilayer film of two or more synthetic resins.

\* \* \* \* \*